United States Patent Office 2,939,315
Patented June 7, 1960

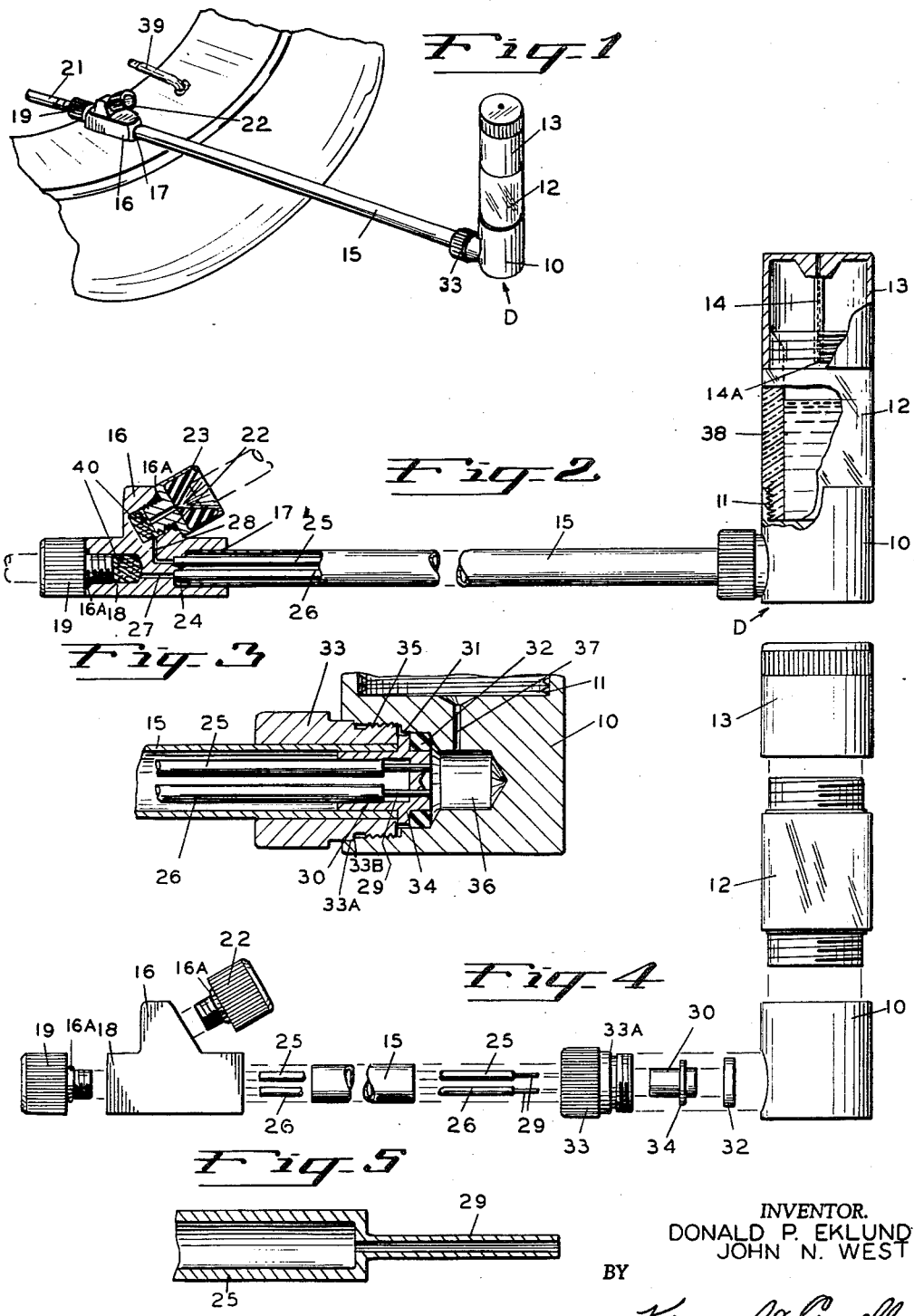

2,939,315

LEAK DETECTORS FOR TIRE VALVES

Donald P. Eklund, 303 Carnine Road, and John N. West, Box 307, both of Castle Rock, Wash.

Filed Mar. 23, 1959, Ser. No. 801,131

1 Claim. (Cl. 73—48)

The present invention relates to leak detectors for tire valves of the type used with dual wheel trucks and the like.

The primary object of the invention is to provide a leak detector that is attached to valve stems of dual tires for testing for leaks in the valve cores. In the carrying out of this object, a leaky core is detected by means of bubbling the leaking air through a transparent fluid container.

Another object of the invention is to provide a device of the character described for use with valve stems in dual wheels which usually face in opposite directions, the device being easily applied to either of the valve stems at will by the operator.

Other objects and advantages will become apparent in the following specification when considered in light of the attached drawings, in which:

Figure 1 is a perspective view of the invention illustraining a fragmentary portion of the stem to which the device is applied;

Figure 2 is a fragmentary side view of the invention with parts broken away and in section for convenience of illustration;

Figure 3 is an enlarged fragmentary detail sectional view;

Figure 4 is an exploded elevational view of the various parts forming the invention; and Figure 5 is an enlarged fragmentary sectional view of the reduced end of one of the air conducting tubes.

Referring now to the drawings in detail wherein like reference characters indicate like parts throughout the several figures, the reference character D indicates generally a leak detector including a main body 10. The body 10 is provided in its upper end with threads 11 into which is secured a transparent liquid container 12 formed of glass, plastic or the like. Threadably secured to the upper end of this container is a cap 13. Extending downwardly within the cap 13 is a breather tube 14 arranged to release any air pressure developed within the liquid air container 12 in a manner which will later be more readily understood.

An adapter 16 is connected to the body 10 of the device by a tubular stem 15. The adapter 16 is secured to the tubular stem 15 by any suitable means, as by a press or sweated fit at 17. Threaded into the oppositely disposed end 18 of the adapter 16 is a cup-like fitting 19, which can be applied to the valve stem 21 of one of the dual tires.

Another fitting 22, identical to the fitting 19, is threaded into the adapter 16 at an angle thereto facing in the reverse direction, as best indicated in Figure 2. The fitting 22 has been shown in section to more clearly disclose the structure of the fittings 19 and 22. Located in the cup-like fitting is a resilient cone-shaped gasket 23 to fit over the end of the valve stem 21, insuring an air tight seal.

An air tight seal is maintained between the fittings 19, 22 and the adapter body 16 by resilient sealing O-rings 16A.

Fixedly secured within the adapter 16 at 24 are air tubes 25 and 26. These tubes register with ports 27 and 28 connected to the cup-like fittings 19 and 22. The tubes 25 and 26 extend through the tubular stem 15 and each terminate in reduced orifices 29. Secured and sealed to each of the tubes 25 and 26 and to the tubular stem 15 is a ferrule 30.

The ferrule 30 engages in the socket 31 formed in one side of the body 10 and against a resilient seal 32. The ferrule 30 is held in place by a lock nut 33 bearing against the shoulder 34 of the ferrule 30 and threaded within the threaded portion 35 of the body 10, as best illustrated in Figures 3 and 4.

The lock nut 33 has an annular shoulder 33A which abuts against an internal annular shoulder 33B within the body 10, limiting the inward movement of the lock nut 33, but permitting it to enter the socket 31 a distance to compress the resilient seal 32 sufficiently to insure sealing of the joint, but permitting sufficient freedom within the fitting to be able to revolve the body 10 about the tubular stem 15 in the operation of the tester. The reason for this freedom of rotation is to maintain the body 10 and the liquid container 12 to a vertical position while operating the tester, regardless of the position of the valve stems on the wheel of the vehicle.

In the operation of this new and improved leak detector for dual tires, when the same is applied to the valve stem 21, as shown in Figure 1, a tight fit is obtained between the end of the stem and the cup-like fitting 19 by means of the gasket 23. If the valve 21 is leaking, air will pass from the fitting 19 through the tube 26 and into the chamber 36 through the port 37 and into the transparent container 12, passing up through the fluid 38 so as to cause a bubble to appear visible through the transparent container 12.

The fluid 38 should be of such a viscosity so that the same will not flow back through the reduced orifices of the tubes 25 and 26. The ease of passage of the air through the fluid in the container 12 permits the air to flow therethrough with no passage of air between the tubes 25 and 26 when being adapted to the valve stems of the tire.

It is not desirable to have air pressure develop within the transparent container 12, therefore air will escape from the bubble up through the breather tube 14 to the atmosphere.

In the event it is desired to use the tester on the valve stem 39, the fitting 22 is applied thereto and the air will pass through the tube 25 up through the testing container 12, as above described. In either event the reduced orifices 29 will prevent air or the fluid 38 from readily flowing back through the tube not being applied to one of the valve stems on the tire.

The lower end 14A of the breather tube 14 is positioned within the liquid container 12 so that the liquid 38 will not be permitted to flow out of the same regardless of the position of the said liquid holding tube, whether the tube is as shown in the drawings inverted thereto, or lying on its side.

Filter material 40, such as cotton, is located under the fittings 19 and 22 within the adapter 16. The object is to prevent any foreign matter from entering the tubes 25 or 26.

The removable nut 13 has a knurled surface 13A to facilitate placing or the removing of the same.

Having thus described the preferred embodiment of the invention, it should be understood that numerous structural modifications and adaptations may be resorted to without departing from the scope of the appended claim.

What is claimed is:

A leak detector for the valve stems of dual pneumatic tires comprising a body, a transparent container having fluid therein supported by and communicating with said body, a breather tube in said transparent container, said body having a socket therein, a tubular stem extending from said socket body, an adapter secured at one end to said tubular stem, a cup like fitting adapter for engagement with a valve stem on the other end of said adapter, a second cup like fitting threaded onto said adapter and facing in a reverse direction to said first mentioned cup like fitting adapted for engagement with a second valve stem of a dual tire, a pair of air tubes in said adapter, each tube communicating with a cup like fitting, each air tube extending through said tubular stem, and each having a reduced end orifice, a ferrule secured to each tube and to said tubular stem and seating in said socket, a seal in said socket and a lock nut securing said ferrule in said socket against said seal for rotative movement of said body relative to said adapter to permit said container to remain in upright position.

References Cited in the file of this patent

UNITED STATES PATENTS

| | | |
|---|---|---|
| 1,683,095 | Offemaria | Sept. 4, 1928 |
| 2,665,580 | Clawson | Jan. 12, 1954 |

FOREIGN PATENTS

| | | |
|---|---|---|
| 625,290 | Great Britain | June 24, 1949 |